(12) United States Patent
Van Eyck

(10) Patent No.: US 7,930,603 B2
(45) Date of Patent: Apr. 19, 2011

(54) FEATURE-ORIENTED TEST PROGRAM DEVELOPMENT AND EXECUTION

(75) Inventor: Jan Van Eyck, Boeblingen (DE)

(73) Assignee: Verigy (Singapore) Pte. Ltd., Singapore (SG)

( * ) Notice: Subject to any disclaimer, the term of this patent is extended or adjusted under 35 U.S.C. 154(b) by 1068 days.

(21) Appl. No.: 11/724,448

(22) Filed: Mar. 15, 2007

(65) Prior Publication Data

US 2007/0250570 A1    Oct. 25, 2007

Related U.S. Application Data

(63) Continuation of application No. PCT/EP2004/052487, filed on Oct. 8, 2004.

(51) Int. Cl.
*G01R 31/28* (2006.01)
(52) U.S. Cl. .......................................... 714/724; 714/26
(58) Field of Classification Search .................. 725/70; 709/273; 712/11; 705/8; 370/241; 714/724, 714/26
See application file for complete search history.

(56) References Cited

U.S. PATENT DOCUMENTS

| | | | | |
|---|---|---|---|---|
| 5,951,639 A * | 9/1999 | MacInnis | ......................... | 725/70 |
| 6,473,794 B1 * | 10/2002 | Guheen et al. | ................. | 709/223 |
| 7,263,597 B2 * | 8/2007 | Everdell et al. | .................. | 712/11 |
| 7,548,055 B2 * | 6/2009 | Khandros et al. | .......... | 324/158.1 |
| 2003/0083919 A1 * | 5/2003 | Hammann | ......................... | 705/8 |
| 2005/0068898 A1 * | 3/2005 | Xu | ................. | 370/241 |

FOREIGN PATENT DOCUMENTS

GB         2 357 600       6/2001

* cited by examiner

*Primary Examiner* — David Ton
(74) *Attorney, Agent, or Firm* — Holland & Hart, LLP

(57) ABSTRACT

A resource constraint management unit for a target test system is described. The resource constraint management unit has an interface adapted for receiving, together with a test program, feature specifications for at least one test of the test program, said feature specifications indicating test system capabilities required for performing a certain test. The resource constraint management unit further has a feature specification evaluator adapted for comparing, on a per-test basis, feature specifications for a respective test with the capabilities of the target test system, for determining, for each of the tests, whether the target test system is capable of performing the respective test or not; and for initiating test execution in case the capabilities of the target test system allow for performing said test.

26 Claims, 6 Drawing Sheets

FEATURE-ORIENTED TEST PROGRAM DEVELOPMENT AND EXECUTION

CROSS-REFERENCE TO RELATED APPLICATIONS

This application is a continuation of copending International Application No. PCT/EP2004/052487, filed Oct. 8, 2004, which designated the United States, and was not published in English and is incorporated herein by reference in its entirety.

TECHNICAL FIELD

The present invention relates to a resource constraint management unit for a target test system, to a set-up environment for test programs used to test specific devices on certain target test systems, and to a method for adapting execution of a test program to a particular target test system.

BACKGROUND

Several different types or hardware configurations of automated test systems (ATEs) might be used in a company for testing integrated circuits. For example, test programs might be developed on a high-end machine located at the company's R&D department. After test program development—comprising test program creation and interactive debugging on the actual ATE—has been finished, the test program might be executed on less advanced test systems at a manufacturing floor. Hence, test programs developed on a first ATE (Automated Test Equipment) have to run on another type or hardware configuration of ATE as well. The question arises how to achieve test program compatibility between different types or hardware configurations of ATEs.

SUMMARY

According to an embodiment, a system for adapting a native test program adapted for testing integrated circuits with a native automated test system to the requirements of a target automated test system may have: a user interface adapted for reading the native test program including a pin configuration, feature specifications and a test set-up of the native test program and for allowing the user to specify a pin configuration, the pin configuration involving an assignment of pin names to per-pin tester resources, feature specifications indicating target test system capabilities required for performing a respective test, and a test set-up of the target automatic test system, the test set-up having settings and parameters that are loaded to per-pin tester resources before performing a respective test; an interface resource constraint manager adapted for determining if the test set-up is in agreement with the feature specifications and, if this is not the case, to either restrict the parameters of the test set-up or to notify the user accordingly; the user interface having a feature specification module adapted to allow the user to define, on a per-test basis, the feature specifications; the user interface further having a writer and storer for writing back and storing the test program after the pin configuration, feature specifications and the test set-up have been specified.

According to another embodiment, an automated test system may have: an interface adapted for receiving, together with a test program, feature specifications and a pin configuration for at least one test of the test program, said feature specifications indicating, on a per-pin basis, test system capabilities required for performing a certain test; a resource constraint manager; hardware drivers for providing information about hardware resources to the resource constraint manager; the resource constraint manager having a feature specification evaluator adapted for comparing, on a per-test basis, feature specifications for a respective test with the capabilities of the test system, for determining, for each of the tests and for each pin utilized during the test whether the test system is capable of performing the respective test or not; and for initiating test execution in case the capabilities of the test system allow for performing said test.

A set-up environment according to embodiments of the present invention is adapted for generating feature specifications for a test program comprising at least one test. The set-up environment comprises a feature specification module adapted for defining, on a per-test basis, feature specifications indicating target test system capabilities required for performing a respective test. The set-up environment further comprises storing means adapted for storing said feature specifications together with the test program.

The set-up environment according to embodiments of the present invention allows for defining, individually for each test of the test program, features that have to be supported by a target test system. If a target test system supports the features required by a certain test, this test will be executable on the target test system. If a target test system does not support features of a certain test, this test will have to be blanked out, or processed offline. By means of the set-up environment, each test of the test program can be equipped with a feature specification indicating the minimum requirements for performing this test. Whenever a test program of this kind has to be loaded to a target ATE, it can easily be determined, individually for each of the test program's tests, whether the respective test is executable on the target test system or not.

When developing a test, the user might e.g. want to utilize more advanced features. In this case, the test will only run on a few high end test systems. However, if the user restricts himself to simple features, the test will run on almost every target test system. According to embodiments of the present invention, the trade-off between test program compatibility on the one hand and availability of features on the other hand is done before a single test of a test program is developed.

By assigning feature specifications to each of the test program's tests, one and the same test program can be used on different types or hardware configurations of ATEs. Instead of developing a test program for one specific target test system, it is possible to develop a test program for an entire range of target test systems comprising low end as well as high end test systems. On the part of a target test system, the feature specifications allow for determining a respective subset of tests that may be executed on the respective platform. The test program has to be developed only once and only a single test program has to be maintained later on though the target test systems may differ. Therefore the overall cost for test program development and maintenance is reduced. Furthermore, the interoperability between different target test systems is improved, because test programs that have been developed on a first ATE can easily be transferred to another type of ATE. For example, if a company owns a high end test system that is used for R&D, and one or more low end machines that are used at manufacturing, test programs developed at the R&D department can be executed on the test systems at manufacturing as well.

According to another preferred embodiment, the set-up environment is further adapted for defining, on a per-test basis, test set-ups for at least one of the tests. The test set-ups might e.g. comprise settings and parameters that are loaded to the per-pin tester resources before performing a test. The set-up environment allows for interactively defining the test set-ups of a respective test.

According to a preferred embodiment, the set-up environment is further adapted for defining a pin configuration by assigning tester resources to pin names. On the one hand, feature sets defining allowed parameter ranges may be assigned to a pin name. On the other hand, for each pin name corresponding test set-ups may be specified for being loaded to the tester resources.

According to a preferred embodiment, the interactive set-up environment is an integral part of an automated test equipment (ATE). Test programs developed on this automated test equipment are developed for a set of intended target test systems rather than on a specific ATE. Thus, hardware compatibility will be accomplished by an explicit user action rather than being an "accidental occurrence".

According to another preferred embodiment, the feature specifications comprise feature sets for individual pins. For each test, feature specifications are set up by specifying feature sets for each tester pin that is utilized. Hence, the feature sets, which might e.g. comprise features like voltage levels, vector rates, etc., are set up in correspondence with the per-pin tester resources of the intended target test system. If, for a certain test, the per-pin tester resources of a target test system match with the feature sets, the test can be executed on the respective target test system.

According to another preferred embodiment, the feature specifications indicate minimum hardware resources required on the part of the target test system for performing a respective test. For example, the feature specifications might refer to a certain type of target test equipment.

According to a further preferred embodiment, the user may specify per-pin feature sets by referring to a certain type of tester resource—e.g. a specific tester channel or instrument type—or to a certain performance level of the target system's tester resources. As a consequence, the feature set is restricted to the features the respective tester resource supports. Furthermore, the user may specify the per-pin feature sets by referring to an intersection of different types of tester resources or performance levels. In this case, the feature set is restricted to those features that are supported by each one of the tester resources of the intersection. A test system may comprise different types of tester resources having different capabilities. By referring to types of tester resources or to an intersection thereof on a per-pin basis, the feature specifications can be adapted individually to the available per-pin tester resources.

According to another preferred embodiment, the user may manually set up feature specifications for a certain test. For this purpose, the feature specification module might comprise interactive editing means that allow for inputting required parameters on a per-test basis. The user may provide the required parameters on a per-pin basis, in order to generate per-pin feature sets.

In a preferred embodiment, the feature specifications refer to at least one of minimum/maximum voltage levels, minimum/maximum voltage ranges, minimum/maximum currents, minimum/maximum frequencies and periods, minimum/maximum data rates, number of waveform resources, number of timing resources, timing resolution, period and frequency resolution, vector memory depth, sequencer memory depth, waveform memory depth, bit resolution. The feature specifications might additionally comprise further parameters for indicating the required test system capabilities.

According to yet another embodiment, the user may set-up feature specifications by selecting one of a plurality of system-defined feature specifications. By referring to predefined feature identifiers, the task of setting up feature specifications can be performed more quickly.

According to a further preferred embodiment, the system-defined feature specifications may be partially or completely replaced by features that are specified manually.

According to an alternative embodiment, a tester description according to a predefined external standard may be used as a basis for setting up the feature specifications.

According to yet another preferred embodiment, the feature specifications for a certain test are generated by referring to the current test system's capabilities. The features of the current test system might e.g. be obtained by accessing the current system's model file, which contains information about the current system or by performing an automatic detection of the actual ATE hardware.

According to a preferred embodiment, different feature specifications may be provided for different tests of a test program. For different tests of a test program, different capabilities of a target test system might be required. On the part of a target test system, this allows for determining, on a per-test basis, whether the target test system is capable of executing a respective test or not. If the feature specifications are set-up on a per-pin basis, there may exist different per-pin feature sets related to different tests.

In a preferred embodiment, the set-up environment is adapted for restricting features a user may utilize when developing a test program in accordance with the feature specifications. In this embodiments, the set-up environment is adapted for giving access only to features described by the feature specification and/or for ignoring inputs that do not agree with the feature specifications. Hence, it is made sure that when setting up a certain test, only the features defined in the feature specifications are used.

According to a preferred embodiment, the set-up environment is adapted for restricting parameter ranges for test set-ups according to the feature specifications. When specifying the test set-ups, the user is limited to the settings and parameter ranges of the feature specifications. the set-up environment is adapted for ignoring any user inputs that extend beyond the limits defined by the feature specifications. If the feature specifications correspond to features of a certain target ATE, the set-up environment will behave like the respective target ATE.

According to another preferred embodiment, the set-up environment comprises cross check facilities adapted for continuously monitoring whether the features of a test that is being developed match with the capabilities of the intended target ATEs. If they do not match, the cross check facilities will notify the user. In this case, the cross check facilities might e.g. provide suggestions how to restrict the features of the present test.

Embodiments of the present invention further relate to an ATE system software that comprises a set-up environment as described above. According to a further preferred embodiment, the set-up-environment is adapted for interactively specifying and modifying the feature specifications.

A resource constraint management unit according to embodiments of this invention comprises an interface adapted for receiving, together with a test program, feature specifications for at least one test of the test program. The feature specifications indicate test system capabilities required for performing a certain test. The resource constraint management unit further comprises feature specification evaluation means. The feature specification evaluation means are adapted for comparing, on a per-test basis, feature specifications for a respective test with the capabilities of the target test system, and for determining, for each of the tests, whether the target test system is capable of performing the respective test or not. The feature specification evaluation means are further adapted for initiating test execution on the hardware in case the capabilities of the target test system in use allow for performing the test.

On the part of the target test system, for at least some of the tests of a test program, feature specifications indicating the capabilities required for performing the tests are received. By comparing the per-test feature specifications with the properties of the target test system, it can be determined, on a per-test basis, whether the available resources allow for performing a respective test or not. If the feature specifications for a certain test match with the capabilities of the target test system, test execution will be initiated.

A test program might e.g. comprise tests that match with the current test system's capabilities as well as tests that require features not available on the current test system. In this case, the resource constraint management unit is adapted for initiating execution of those tests that match with the available resources. By implementing a resource constraint management unit as described above, a test program that includes simple tests as well as more advanced tests can be run on a wide variety of different target test systems ranging from low end to high end. Issues of test program compatibility are automatically taken care of by the resource constraint management unit. The user does not have to keep track of different test program versions for different target test systems, because one single test program version can be used for different target test systems.

In a preferred embodiment, the resource constraint management unit is adapted for blanking out tests with feature specifications that do not match with the available tester resources. For example, on a less advanced target test system, only a small subset of the test program might be performed, whereas on a high-end machine, a large subset (or even all) the tests might be executed.

According to a preferred embodiment, the resource constraint management unit comprises offline processing facilities adapted for taking care of those tests that cannot be performed by the available tester hardware. Whenever the feature specification evaluation means determine that the feature specification of a certain test does not match with the available tester resources, actual test execution is replaced by an offline processing of the test.

In a preferred embodiment, the offline processing facilities generate emulated test results whenever the available tester resources do not allow for performing a certain test. In these cases, actual test execution is replaced by an emulation of the test. Hence, the target test system may log the test results for all the tests of the test program, whereby result data of tests that have not actually been carried out is indicated.

According to another preferred embodiment, the resource constraint management unit comprises a set-up loader unit. Before a test of the test program is executed, at least one corresponding set-up is loaded to the test system's hardware. The one or more set-ups that correspond to a certain test will only be loaded if the test's feature specifications match with the available tester resources.

In a preferred embodiment, the feature specifications for a test comprise a multitude of feature sets. For each pin, at least for each pin that is utilized by the test, a corresponding feature set is specified. According to yet another preferred embodiment, the feature specification evaluation means are adapted for determining, for each pin that is utilized during a test, whether the corresponding feature set matches with the corresponding per-pin tester resources. By comparing feature sets with tester resources on a per-pin basis for each pin utilized during a test, it is possible to find out whether the test as a whole can be performed or not.

The invention can be partly or entirely embodied or supported by one or more suitable software programs, which can be stored on or otherwise provided by any kind of data carrier, and which might be executed in or by any suitable data processing unit. Software programs or routines are preferably applied for adapting execution of a test program to a particular target test system.

BRIEF DESCRIPTION OF DRAWINGS

Other objects and many of the attendant advantages of embodiments of the present invention will be readily appreciated and become better understood by reference to the following more detailed description of preferred embodiments in connection with the accompanied drawing(s) Features that are substantially or functionally equal or similar will be referred to with the same reference sign(s).

DETAILED DESCRIPTION

An automated test equipment (ATE) generally comprises an ATE system software and a multitude of tester resources (channel cards and/or instruments), with the tester resources being controlled by the test program for providing test signals to and receiving test signals from a device under test (DUT). At a test floor of a customer, ATEs with channel cards of different product generations and speed/performance classes might exist. Furthermore, there might exist different releases of ATE system software used to load, develop, execute and save test programs leading to corresponding test program versions. Customers generally expect test program compatibility between different hardware resources offering the same capabilities as well as between different software releases.

Figure 1:
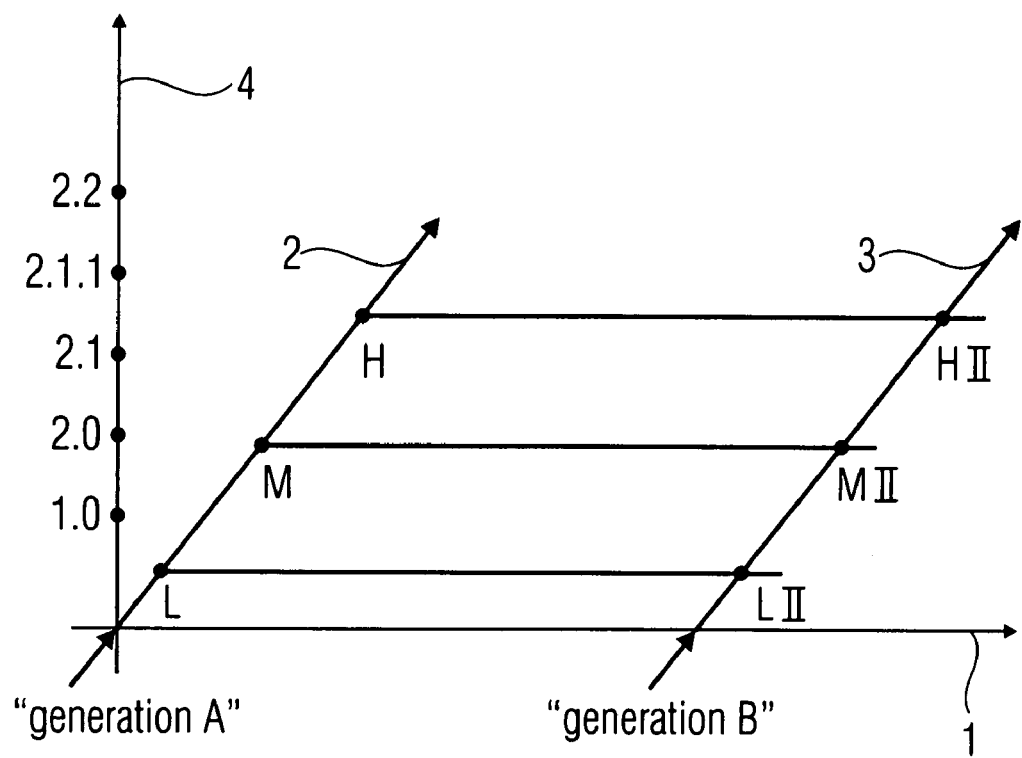
FIG. 1 gives an overview of different hardware and software versions.

FIG. 1 shows an example of different tester resources and test program versions. Along the axis 1, two different product generations of per-pin tester resources are depicted: a former hardware generation named "generation A" and a new hardware generation named "generation B". Generation A comprises three different speed/performance classes "L" (low cost), "M" (medium cost) and "H" (high end). The speed/performance classes "L", "NM", "H", which provide superseding feature sets from low cost to high end, are depicted along the axis 2. Generation B comprises the speed classes "LII" (low cost), "MII" (medium cost) and "HII" (high end), which are sketched along the axis 3. The diagram's third dimension corresponds to the various software versions. Along the axis 4, different test program versions comprising the releases 1.0, 2.0, 2.1, 2.1.1, 2.2 are indicated.

For example, a customer might have developed test programs for a former product generation, e.g. for a "generation A" system. Now, the customer buys one or more "generation B" systems and intends to upgrade his old test programs, whereby he wants to take advantage of new features offered by the "generation B" system for testing a certain device. Another customer might have bought a state of the art ATE system for his R&D site, but at the manufacturing sites, test systems of former product generations are still in use. In this case, test programs are developed on a more capable test system like e.g. a test system of "generation B", whereas the test programs are intended to be run on less capable "generation A" systems. According to yet another example, a customer might modify his test programs for the sake of cost reduction. All tests requiring "M" or "MII" capabilities are omitted, and the modified test programs are intended to run on "L" and "LII" tester resources.

In general, customers expect compatibility between different hardware resources offering the same capabilities, as well as between different software releases. Test program compatibility has to deal with different aspects that comprise compatibility of test programs generated by different software versions (software compatibility), and compatibility of test programs generated for different hardware resources (hardware compatibility), whereby hardware compatibility comprises compatibility between different hardware generations (e.g. "generation A" and "generation B") as well as compatibility between different speed/performance classes that provide superseding feature sets from low cost to high end. Of course, test program compatibility can only be achieved for a common feature set of different software versions or different tester resources.

Generally, a compatibility statement comprises both a statement with regard to forward compatibility as well as with regard to backward compatibility. A system is forward compatible if it is compatible with (e.g. data can be read by) later versions of itself. A system is backward compatible if it is compatible with (e.g. can share data with) earlier versions of itself, or sometimes other earlier systems, particularly systems it intends to supplant.

Software compatibility is defined as the capability to load and execute test programs that have been saved with another software version. With regard to software compatibility, a desirable behaviour could e.g. include forward compatibility between all releases without throughput-degrade for load, execution and save of test programs, and backward compatibility between minor releases, e.g. between release 2.1.1 and 2.1. Between major releases, e.g. between release 2.0 and 1.0, backward compatibility might not necessarily be required.

Hardware compatibility is defined as the capability to load and execute test programs without throughput-degrade, which have been saved on another hardware using the same software revision. Preferably, hardware compatibility comprises forward compatibility between different hardware generations, at least as far as there are no hardware limitations like e.g. incompatible level ranges. For example, test programs that have been developed on a "generation A" system can be executed on a "generation B" system. Further preferably, hardware compatibility includes forward compatibility between different speed classes that provide superseding feature sets from low cost to high end. This type of forward compatibility implies that test programs that have been developed on a "M"-channel can be executed on a "H"-channel. However, there might exist hardware limitations that impose restrictions upon forward compatibility. Besides that, hardware compatibility includes backward compatibility between different types of channel cards as far as the different types of channel cards support a common set of hardware features utilized by a test program. For example, a test program that has been saved on a "generation B" system and that does not utilize any "generation B" specific features can be executed on a "generation A" system.

Preferably, it should be possible to run the same test program on different ATE systems (system software and tester resources) with a minimum of investment.

Figure 2:
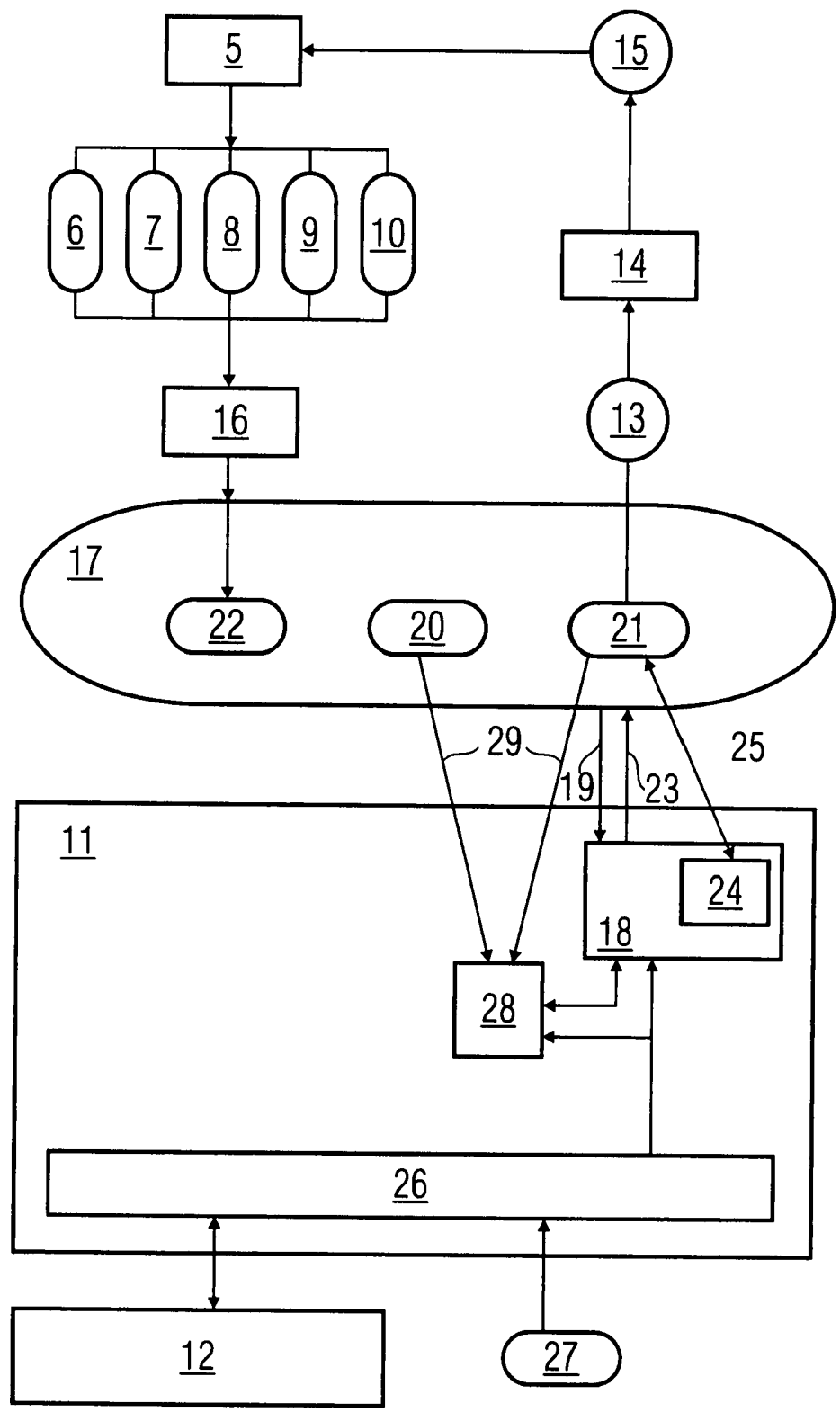
FIG. 2 shows the process of test program development.

In FIG. 2, the process of test development is shown. Files provided by the electronic design automation (EDA) domain 5 are generally used as a starting point for generating test patterns. The EDA domain 5 might provide design simulation data, like e.g. VCD files 6, Verilog files 7, or VHDL files 8.

Verilog is a popular hardware definition language that has been defined as an open standard (Open Verilog). In general, Verilog is used with the "Cadence" Verilog simulator. Verilog supports behavioral, register transfer level (RTL), gate level description, and stimulus description in one language.

VCD (Verilog Change Dump) is an output from Verilog that is used for test pattern generation. Typically, VCD files have to be translated into another format that can be read by a tester.

VHDL is a VHSIC (Very High Scale Integrated Circuit) Hardware Description Language. VHDL has been defined in the IEEE standard 1076.

The EDA domain 5 might as well provide DFT (Design For Test) data or ATPG (Automatic Test Pattern Generation) data utilizing a dedicated test description language independent of a particular ATE, such as e.g. STIL files 9 or WGL files 10.

STIL (Standard Test Interface Language) as defined in IEEE standard 1450 is designed to transfer high density digital test patterns between simulation, automatic test pattern generation (ATPG), built-in self-test (BIST), and ATE. It supports a tester-neutral description of timing, specifications, patterns and serial scan that can be generated by simulation, conversion and ATPG tools. The waveform representation used in STIL allows for a hierarchical definition of signal timing and is suitable for modern microprocessor bus structures. Timing may be defined as tables of timing specifications and timing relationships. STIL stores serial scan data supporting full, partial or boundary scan in a format structured for direct test execution without requiring further test transformations.

WGL (Waveform Generation Language) is the de-facto standard for ATPG and vector generation. Most pattern development tools support WGL. Furthermore, there exist third party tools that are adapted for converting WGL to various native ATE standards.

On the part of the EDA domain 5, available hardware resources as well as tester resource constraints might be taken into account when generating ATPG or simulation test files. For this purpose, an ATE test program 17 might e.g. provide tester resource constraint (TRC) information 13 indicating the constraints of the tester hardware 12 to a TRC generator 14. The TRC generator 14 is adapted for converting the TRC information 13 to a standard that can be processed by the EDA domain 5. For example, the TRC generator 14 might convert the TRC information 13 into a TRC file 15 according to the standard IEEE 1450.3, which is also referred to as the STIL TRC extension. During the process of generating ATPG or simulation test files, the EDA domain 5 might access the TRC file 15, in order to set-up the test patterns in accordance with the constraints imposed by the available hardware resources.

A design-to-test domain 16 is responsible for converting a respective input file, e.g. a VCD, Verilog, or VHDL file, a WGL file or a STIL file, into the corresponding native ATE test program 17, which can be processed by the ATE. The test data delivered by the EDA domain 5 can be an event-based test file, i.e. it contains events like e.g. signal edges that are lined up one after another within an analogue time domain. A test of this kind cannot be executed directly by an ATE. Therefore, the design-to-test domain 16 is adapted for converting event-based tests into cycle-based tests by applying cycle definitions specified by the user.

According to embodiments of the present invention, the ATE system software 11 comprises a set-up and debug user interface 18 for interactively adapting the ATE test program 17 in accordance with the capabilities of the target ATEs. In particular, the set-up and debug user interface 18 is adapted for reading (19) the ATE test program 17, for specifying a pin configuration 20, feature specifications 21, and test set-ups 22, and for writing back (23) the ATE test program 17.

In a first step, the pin configuration 20 is set up. By means of the set-up and debug user interface 18, the user may specify tester resources of the target ATE, and assign pin names to per-pin tester resources.

In a next step, the user may set up feature specifications 21 indicating test system capabilities of the intended target ATEs. The set-up and debug user interface 18 comprises a feature specification editor 24 adapted for accessing and editing (25) the feature specifications 21. By means of the feature specifications 21, the user may purposely restrict the utilized test system capabilities. The feature specifications 21 might e.g. comprise feature sets that are set up individually for each test, and individually for each per-pin tester resource that is used to test a pin of a device under test (DUT). If the user restricts the functionality of a test to a minimum, the respective test will be executable on any target ATE. However, if the user wants to take advantage of more advanced features, the resulting test will only be executable on high end target ATEs. Hence, before generating a native ATE test program, the user has to find a compromise between test program compatibility on the one hand, and availability of advanced features on the other hand. In general, the user is going to analyze both the test methodology and the available tester resources before specifying the features and capabilities required for a certain test and will set-up the feature specification accordingly.

There exist several different possibilities how feature specifications for a certain test can be set up. A first possibility is to manually specify individual features and required specifications by means of the feature specification editor 24. As an example, let us assume that the hardware of the target ATE comprises one or more digital channels. In this case, the feature specifications might e.g. comprise:
 minimum/maximum vector period
 minimum/maximum master clock frequency
 number of waveforms per vector
 number of signal edges per vector
 vector memory depth
 sequencer memory depth
 voltage range
 etc.

In general, feature specifications will most likely refer to measurement or signal generation capabilities of the tester resources, not to hardware specifications or hardware features that are hidden to a user.

A second possibility for specifying feature sets is to refer to system-defined identifiers that reflect features or channel specifications of a specific channel card, or by explicitly referring to a type of channel card like e.g. M or LII. Furthermore, a feature set can be defined by referring to an intersection of the features of two or more channel types, e.g. by referring to the common features of the channel cards M and MII: M ∩ MII.

According to another variant, the feature sets are set up by processing any kind of predefined industry standard tester description.

According to another possibility, system-defined feature specifications are taken as a starting point, whereby the predefined features are interactively edited and replaced according to the user's needs.

Yet another possibility is to define the feature sets by referring to the capabilities of the ATE the ATE test program 17 is developed on. For example, by performing an automatic detection of the actual ATE hardware 12, the current system's capabilities can be obtained from the hardware drivers 26. Alternatively, an ATE description file 27 might be accessed, which contains all information about the test system configuration that is required by the ATE system software to emulate the tester hardware when no physical hardware is available.

The feature specification editor 24 might support one or more of the above-described possibilities for setting up the feature specifications 21. Generally, a test program comprises a sequence of different tests. In this case, it is possible to specify varying feature sets for the different tests.

In a third steps, after the pin configuration 20 and the feature specifications 21 have been defined, the test set-ups 22 are specified. The test set-ups 22 comprise values and parameters that will be loaded to the hardware resources of the respective target ATE.

The ATE system software 11 further comprises a resource constraint manager 28. Both the pin configuration 20 and the feature specifications 21 are provided (29) to the resource constraint manager 28. The resource constraint manager 28 is adapted for monitoring if the test set-ups 22 specified by a user are in agreement with the feature specifications 21 that have been defined before.

Figure 3:
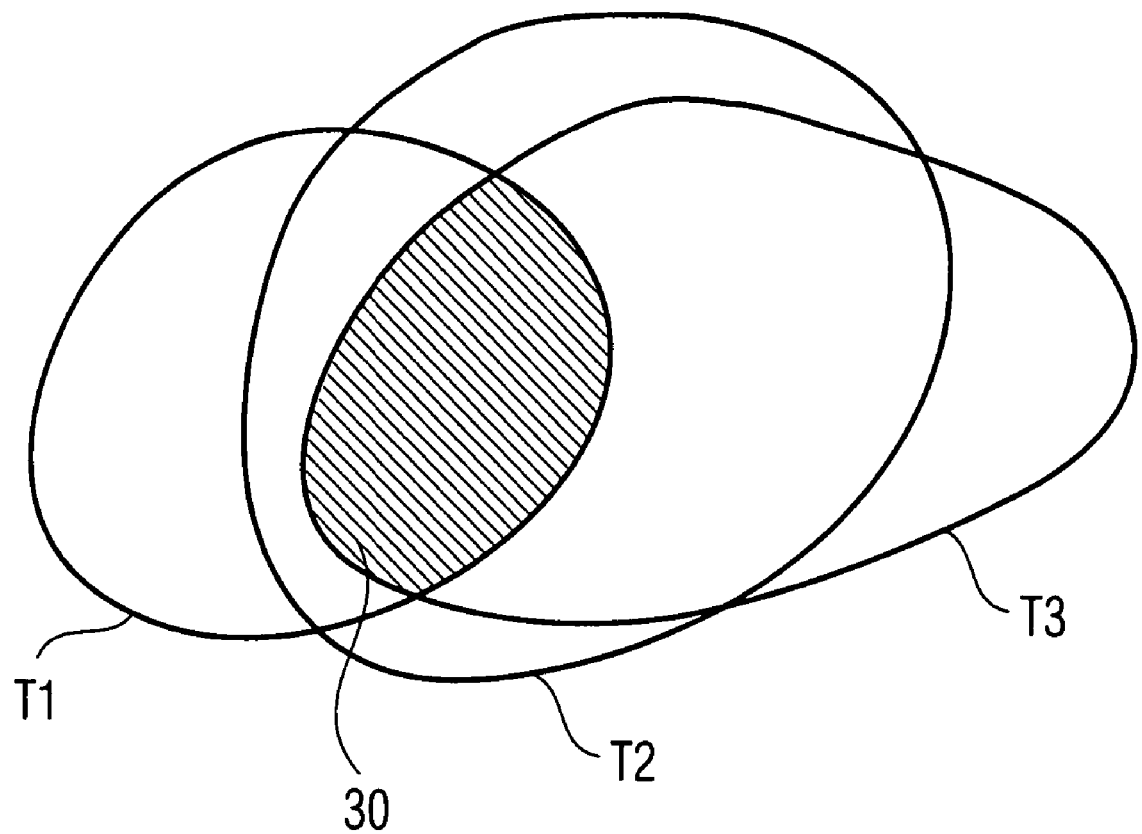
FIG. 3 depicts how the set of allowed features can be limited to an intersection of three target ATEs T1, T2, T3.

At this point, there exist several possible implementations. According to a first embodiment, the resource constraint manager 28 and the set-up and debug user interface 18 are adapted for restricting the parameter ranges of the test set-ups 22 in a way that an agreement with the feature specifications 21 is enforced. In this embodiment, the user must not enter any test set-ups 22 that do not conform with the feature specifications 21. A respective example is shown in FIG. 3. In this example, the feature specifications 21 have been set up as an intersection of the capabilities of three different target ATEs: T1, T2, T3. The feature specifications 21 correspond to the region 30 indicated in FIG. 3. Hence, the features and parameter ranges a user may utilize are limited to the features within the region 30. If a user tries to input parameters that extend beyond these limits, these inputs won't be accepted by the set-up and debug user interface 18. In this respect, the ATE used for developing the ATE test program 17 behaves like the intended target ATE, or like an intersection of different target ATEs.

According to a second embodiment, the resource constraint manager 28 is adapted for monitoring if the test set-ups 22 do agree with the feature specifications 21 that have been defined before. When features or parameters are used that do not agree with the feature specifications 21, the user will be notified. In this embodiment, the possible parameter ranges are not strictly limited to the features defined in the feature specification 21. However, the resource constraint manager 28 is adapted for crosschecking the user inputs, and for indicating to the user if the respective inputs are not in agreement with the feature specifications 21. In this embodiment, it is left to a respective target ATE to blank out tests that comprise features extending beyond the capabilities of the target ATE.

After the pin configuration 20, the feature specifications 21, and the test set-ups 22 have been set up, the ATE test program 17 is written back (23). Next, the ATE test program 17, which might e.g. be stored on some kind of data carrier, is either executed on the target ATE in use or is transported to another target ATE.

Figure 4:
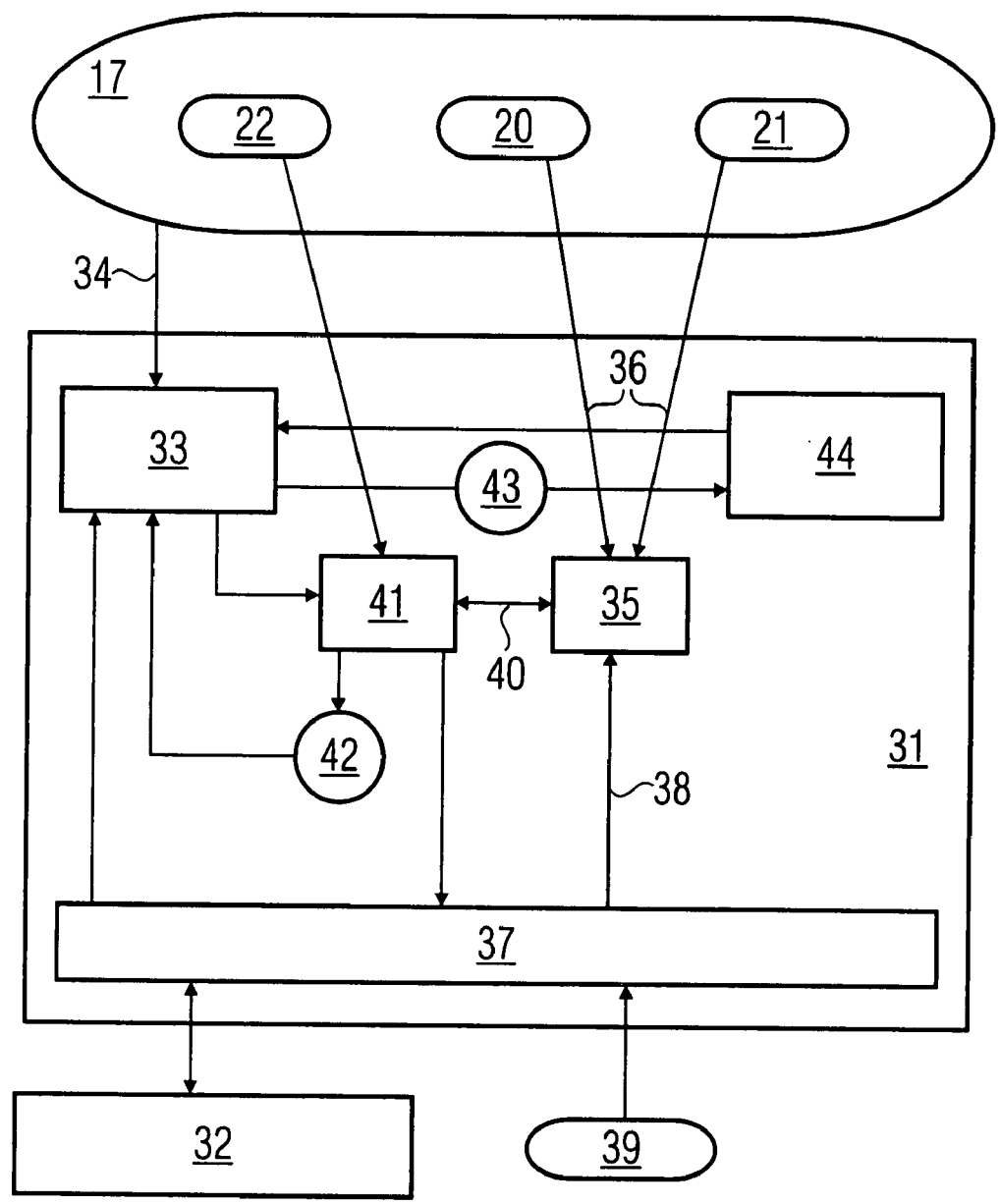
FIG. 4 shows a target ATE where the ATE test program is actually executed.

FIG. 4 shows a target ATE where the test sequence of the ATE test program 17 is actually executed. The target ATE comprises an ATE system software 31 and ATE hardware 32, which might e.g. comprise per-pin tester resources, in particular channel cards, instruments, etc. The type and/or the configuration of the ATE hardware 32 may be completely different from the ATE hardware 12 shown in FIG. 2. The version of the target ATE's system software 31 may differ from the version of the ATE system software 11 shown in FIG. 2. The ATE system software 31 comprises an executor module 33 adapted for accessing (34) and processing the ATE test program 17. For each test, the features required for performing the respective test have to be compared with the available hardware resources. This comparison is performed by the resource constraint manager 35. For this purpose, both the pin configuration 20 and the feature specifications 21 are provided (36) to the resource constraint manager 35. The hardware drivers 37 provide information 38 about the actual hardware resources to the resource constraint manager 35, whereby the hardware drivers 37 might acquire this information by performing an automatic detection of the actual ATE hardware 32 and/or by accessing an ATE description file 39. By comparing the feature specifications 21 with the available hardware resources on a per-test basis, the resource constraint manager 35 determines, individually for each one of the tests, whether the ATE hardware 32 is capable of executing the respective test or not.

Preferably, the feature specifications 21 comprise, for each test, per-pin feature sets that indicate, on a per-pin basis, the required tester resources. Accordingly, the resource constraint manager 35 is adapted for comparing, for each test and for each pin that is utilized during this test, the respective feature set with the capabilities of the tester hardware. If, for a certain test, the feature sets of all pins utilized during the test match with the corresponding per-pin hardware resources, test execution will be initiated. This corresponds to ANDing the respective results of the per-pin comparisons.

The resource constraint manager 35 indicates (40) to a loader 41 whether or not a respective test can be executed. If a test is executable, the loader 41 will load a corresponding one of the test set-ups 22 via the hardware drivers 37 to the ATE hardware 32, which will then execute the respective test. Test results obtained during test execution are forwarded, via the hardware drivers 37, to the executor module 33.

If the resource constraint manager 35 indicates (40) to the loader 41 that the ATE hardware 32 is not capable of performing a certain test, the loader 41 will load the corresponding one of the test set-ups 22 to an offline test set-up data storage 42. As it is not possible to actually perform the respective test, the executor module 33 performs an offline processing of this test in order to generate result data. For example, the parameters of the test set-up might be taken as a basis for emulating test execution. The executor module 33 provides the test result data 43 to a set-up and debug user interface 44, which comprises a graphical user interface for displaying the test result data. The test result data 43 includes, for each test, an indication whether the respective test has been actually performed, or whether the test results have been obtained by performing an offline processing of the test.

Now, test result data is available. In the process of debugging the created test program 17, the user may iteratively modify the set-up parameters dependent on the generated test result data.

Figure 5A:
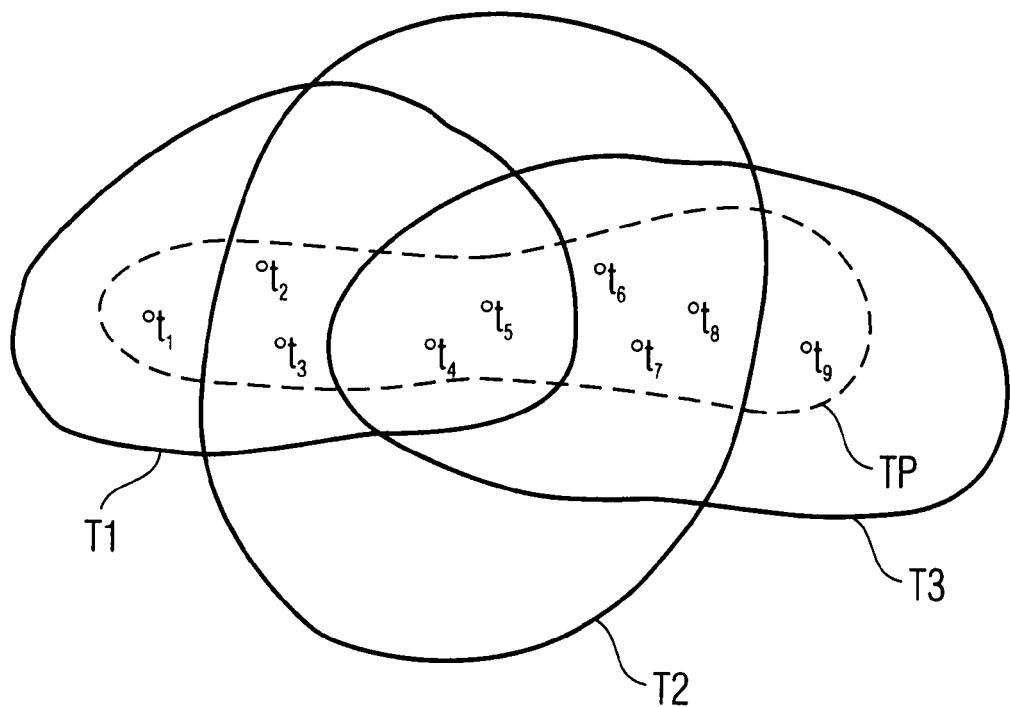
FIG. 5 shows a test program TP comprising 9 tests, together with the capabilities of three different test systems T1, T2, T3.

In FIG. 5A, a test program TP is schematically depicted. The test program TP comprises a sequence of 9 tests t1, t2, . . . t9. For each of these tests, corresponding feature specifications indicating the required capabilities of a target test system have been specified, whereby for each test t1, t2, . . . t9 of the test program TP, different feature specifications might be provided.

As shown in FIG. 4, the ATE system software 31 of a target test system comprises a loader 41 and a resource constraint manager 35. When a test program, like e.g. the test program TP shown in FIG. 5A, is loaded to the target ATE, the resource constraint manager 35 determines, individually for each one of the tests t1 to t9, whether the ATE hardware 32 is capable of executing the respective test or not. Only if the available hardware resources match with the feature specifications of a respective test, the loader 41 will load the test's set-ups into the tester's hardware resources. If the tester hardware 32 is not capable of executing a certain test, the test's set-up will not be loaded. The resource constraint manager 35 is adapted for comparing the feature specifications with the available hardware resources on a per-test basis. The possible outcome of this comparison is indicated in FIG. 5A. A target test system T1 might e.g. be capable of executing the tests t1 to t5, whereas T1 might not be capable of executing the tests t6 to t9. Another target test system T2 might be capable of executing a subset of tests comprising t2, t3, . . . t8, whereas the tests t1, t9 cannot be performed. The test system T3 might be capable of executing the tests t4 to t9, but the feature specifications of t1 to t3 do not match with the capabilities of T3.

Figure 5B:
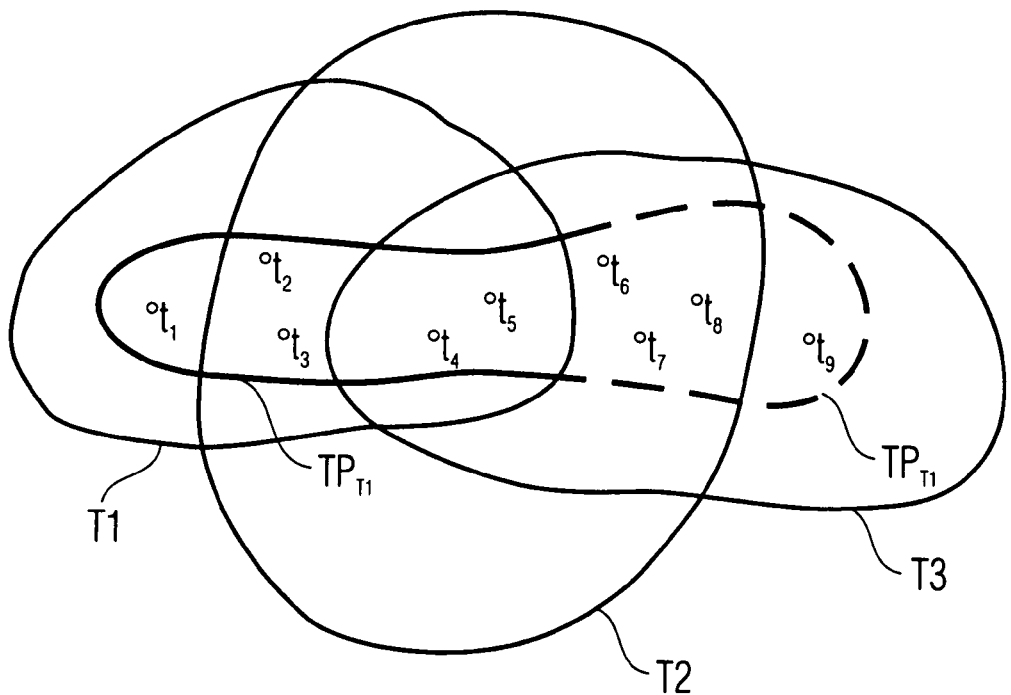

In FIG. 5B, it is shown how the tests of the test program TP are divided into a first subset TPT1 of tests that match with the capabilities of the test system T1, and into a second subset TPNOT(T1) of tests that cannot be executed on T1. The resource constraint manager 35 determines that TPT1 comprises the tests t1 to t5, and that TPNOT(T1) comprises the test t6 to t9.

Figure 6A:
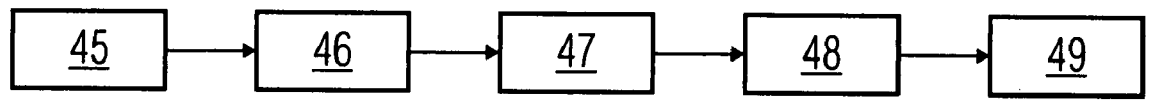
FIG. 6 depicts two different data models that provide an interrelationship between test set-ups and feature sets.
Figure 6B:
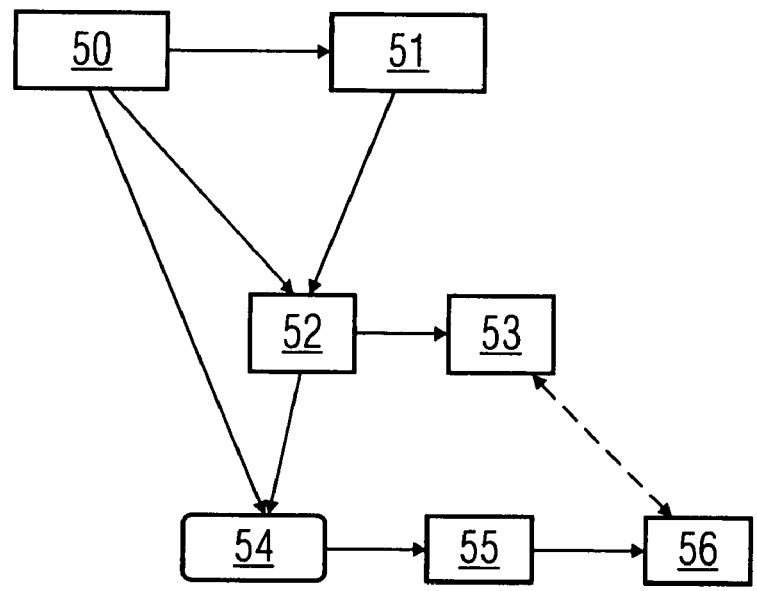

After test execution is finished, the target test system logs the test results. In a preferred embodiment, test result data for each test of the test program includes an indication whether a respective test has been actually performed or not. For example, in the case shown in FIG. 5B, the test result data might comprise result data for the tests contained in the subset TPNOT(TP), which have not been performed. Result data for tests that have not been performed, like e.g. for the tests t6 to t9 in FIG. 5B, might e.g. be obtained by performing an offline processing of these tests. In the result file, it is indicated that the tests t6 to t9 have not actually been executed, and that the corresponding test results have been obtained by means of offline processing. The test results of the tests t6 to t9 might e.g. be obtained by emulating these tests. Starting from a hardware description of the device under test, emulated test results can be generated offline by considering noise levels, by superimposing jitter, etc. In FIGS. 6A and 6B, two different data models are depicted. A data model provides an inter-relationship between test set-ups and feature sets.

According to the first data model shown in FIG. 6A, a test program 45 consists of one or more tests 46. Each one of the tests 46 uses a corresponding test set-up 47. Each one of the test set-ups 47 consists of N per-pin test set-ups 48, with $N \geq 1$ being a natural number. Each of the N per-pin test set-ups 48 refers to a feature set 49, whereby several per-pin test set-ups 48 may refer to one and the same feature set 49.

FIG. 6B shows a more complex data model that introduces the notion of feature specifications as a context for tests. A test program 50 comprises one or more tests 51. Besides that, the test program 50 comprises one or more test set-ups 52, whereby each one of the tests 51 references one of the test set-ups 52. Each of the test set-ups 52 comprises N per-pin test set-ups 53, with N≧1 being a natural number. The test program 50 further comprises one or more feature specifications 54. Each of the test set-ups 52 references exactly one feature specification, whereby each feature specification may be referenced by one or more test set-ups. Each of the feature specifications 54 consists of N per-pin feature set set-ups 55, and each of the per-pin feature set set-ups 55 refers to a feature set 56. Hence, for each of the pins, an implicit relationship 57 between a pin's per-pin test set-up and the feature set 56 is established via one of the feature specifications 54.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A system for adapting a native test program adapted for testing integrated circuits with a native automated test system to the requirements of a target automated test system, the system comprising:
   a user interface adapted for reading the native test program including a pin configuration, feature specifications and a test set-up of the native test program and for allowing the user to specify a pin configuration, the pin configuration involving an assignment of pin names to per-pin tester resources, feature specifications indicating target test system capabilities required for performing a respective test, and a test set-up of the target automatic test system, the test set-up comprising settings and parameters that are loaded to per-pin tester resources before performing a respective test;
   an interface resource constraint manager adapted for determining if the test set-up is in agreement with the feature specifications and, if this is not the case, to either restrict the parameters of the test set-up or to notify the user accordingly;
   the user interface comprising a feature specification module adapted to allow the user to define, on a per-test basis, the feature specifications;
   the user interface further comprising a writer and storer for writing back and storing the test program after the pin configuration, feature specifications and the test set-up have been specified.

2. The system of claim 1, wherein the system is further adapted for defining, on a per-test basis, test set-ups for at least one of the tests.

3. The system of claim 1, wherein the system is further adapted for defining a pin configuration by assigning tester resources to pin names.

4. The system of claim 1, wherein the feature specification module is adapted for specifying, on a per-test and per-pin basis, feature sets indicating target test system capabilities for per-pin tester resources utilized during a test.

5. The system of claim 1, wherein the feature specifications indicate the required capabilities of a target test system in terms of minimum hardware requirements.

6. The system of claim 1, wherein the feature specification module supports setting up the feature specifications by referring to a respective type or tester resources of a target test system, or to an intersection of different types of tester resources.

7. The system of claim 1 wherein the feature specification module comprises an interactive editor that supports a manual set-up of the feature specifications.

8. The system of claim 1, wherein the feature specifications comprise at least one of minimum/maximum voltage levels, minimum/maximum voltage ranges, minimum/maximum currents, minimum/maximum frequencies and periods, minimum/maximum data rates, number of waveform resources, number of timing resources, timing resolution, period and frequency resolution, vector memory depth, sequencer memory depth, waveform memory depth, bit resolution.

9. The system of claim 1, wherein the feature specification module supports setting up the feature specifications by referring to system-defined feature specifications.

10. The system of claim 9, wherein the feature specification module supports partially or completely overriding the system-defined feature specifications by setting-up individually defined features.

11. The system of claim 1, wherein the feature specification module supports setting up the feature specifications by processing a tester description according to a predefined standard.

12. The system of claim 1, wherein the feature specification module supports setting up the feature specifications by retrieving test system capabilities of the current test system.

13. The system of claim 1, wherein the feature specification module supports specifying different feature specifications for different tests of the test program.

14. The system of claim 1, which is adapted for restricting features a user may utilize when developing a test program in accordance with the feature specifications.

15. The system of claim 1, which is adapted for restricting parameter ranges for test set-ups according to the feature specifications.

16. The system of claim 1, further comprising crosscheck facilities adapted for determining if a test set-up matches with the feature specifications.

17. The system of claim 16, wherein the crosscheck facilities are adapted for notifying a user if the test set-up does not match with the feature specifications.

18. An automated test system comprising:
   an interface adapted for receiving, together with a test program, feature specifications and a pin configuration for at least one test of the test program, said feature specifications indicating, on a per-pin basis, test system capabilities required for performing a certain test;
   a resource constraint manager;
   hardware drivers for providing information about hardware resources to the resource constraint manager;
   the resource constraint manager comprising a feature specification evaluator adapted for comparing, on a per-test basis, feature specifications for a respective test with the capabilities of the test system, for determining, for each of the tests and for each pin utilized during the test whether the test system is capable of performing the respective test or not; and for initiating test execution in case the capabilities of the test system allow for performing said test.

19. The system unit of claim 18, wherein the resource constraint managing unit is adapted for not initiating execution of a test of the test program in case the capabilities of the test system do not allow for performing the test.

20. The system of claim 18, further comprising offline processing facilities adapted for replacing actual test execution by an offline processing of a test in case the capabilities of the test system do not allow for performing the test.

21. The system unit of claim 18, wherein, in case the capabilities of the test system do not allow for performing a test, emulated test results are output.

22. The system unit of claim 18, further comprising a set-up loader unit adapted for loading, for each test, at least one corresponding test set-up to the tester resources of the test system.

23. The system unit of claim 18, wherein, in case the feature specification evaluator determines that the test system is not capable of performing a certain test, said set-up loader does not load the at least one corresponding test set-up to the tester resources of the test system.

24. The system unit of claim 18, wherein, the feature specifications comprise, for at least one per-pin tester resource, a corresponding feature set.

25. The system unit of claim 18, wherein the feature specification evaluator is adapted for determining whether the capabilities of the test system match with the feature specifications.

26. The system unit of claim 18, wherein the feature specification evaluator is adapted for determining whether the test system is capable of performing a certain test by determining whether all the per-pin tester resources utilized during said test fulfill the requirements put down in the respective feature sets.

* * * * *

UNITED STATES PATENT AND TRADEMARK OFFICE
CERTIFICATE OF CORRECTION

PATENT NO. : 7,930,603 B2  
APPLICATION NO. : 11/724448  
DATED : April 19, 2011  
INVENTOR(S) : Jan Van Eyck Page 1 of 1

It is certified that error appears in the above-identified patent and that said Letters Patent is hereby corrected as shown below:

Column 6, line 60, "NM" should read --M--.

Signed and Sealed this
Twenty-sixth Day of July, 2011

David J. Kappos
*Director of the United States Patent and Trademark Office*